United States Patent [19]

Yamamura et al.

[11] Patent Number: 5,027,393

[45] Date of Patent: Jun. 25, 1991

[54] VOICE CONFERENCE SYSTEM USING ECHO CANCELLERS

[75] Inventors: Yoshihiro Yamamura; Hitoshi Fuda, both of Tokyo, Japan

[73] Assignee: NEC Corporation, Tokyo, Japan

[21] Appl. No.: 368,646

[22] Filed: Jun. 20, 1989

[30] Foreign Application Priority Data

Jun. 20, 1988 [JP] Japan ................................ 63-152770

[51] Int. Cl.[5] .............................................. H04M 1/00
[52] U.S. Cl. .................................... 379/410; 379/388
[58] Field of Search ............... 379/388, 389, 390, 410; 381/92, 94, 59, 71, 90, 91, 93, 94, 96

[56] References Cited

U.S. PATENT DOCUMENTS

| 4,184,048 | 1/1980 | Alcaide | 379/206 |
| 4,703,506 | 10/1987 | Sakamoto et al. | 381/92 |
| 4,712,244 | 8/1987 | Zwicker et al. | 381/92 |
| 4,802,227 | 1/1989 | Elko et al. | 381/92 |
| 4,819,263 | 4/1989 | Franklin | 379/390 |
| 4,860,366 | 8/1989 | Fukushi et al. | 381/94 |

FOREIGN PATENT DOCUMENTS

| 0200755 | 9/1986 | Japan | 379/410 |
| 0125743 | 6/1987 | Japan | 379/410 |
| 0154840 | 7/1987 | Japan | 379/410 |
| 0250760 | 10/1987 | Japan | 379/410 |
| 0007798 | 1/1989 | Japan | 379/410 |
| 0012648 | 1/1989 | Japan | 379/410 |
| 0024667 | 1/1989 | Japan | 379/410 |

*Primary Examiner*—Jin F. Ng
*Assistant Examiner*—Jhancy Augustus
*Attorney, Agent, or Firm*—Foley & Lardner, Schwartz, Jeffery, Schwaab, Mack, Blumenthal & Evans

[57] ABSTRACT

A voice conference system using echo cancelers. The system consists of at least two microphone to send out voice signals to a remote location, and a loudspeaker which receives in voice signals from the remote location. To prevent the microphone from picking up the loudspeaker sound, each microphone is hooked to the separate terminal of a comparator. Thus the a person's voice in one microphone will pass, but the loudspeaker sound being received equally by both microphones will be cancelled.

3 Claims, 2 Drawing Sheets

VOICE CONFERENCE SYSTEM USING ECHO CANCELLERS

BACKGROUND OF THE INVENTION

The present invention relates to a voice conference system and, more particularly, to a voice conference system using echo cancellers.

In a long-distance telephone network, an echo canceller is coupled to a combination of transmitter and receiver. The echo canceller receives a receive-in signal from a remote party through a receiving path, feeds a receive-out signal to the receiver, receives a send-in signal from the transmitter, and delivers a send-out signal to the remote party through a sending path.

The send-in signal comprises an audio signal when voice or conversation is input to the transmitter. The audio signal becomes the send-out signal. The receive-out signal corresponds to the receive-in signal. The receive-in signal also comprises an audio signal which is produced by the remote party and causes the receiver to reproduce audible sound. The audio signal comprises by the send-in and the receive-in signals, will herein be called an acoustic and a voice signal, respectively, merely for convenience of description. A part of the receive-in signal tends to leak into the send-out signal as an echo signal in the manner known in the art. The echo canceller is for cancelling the echo signal.

Voice conference systems have become known in the art. Such systems are effective for holding a conference or meeting of participants or attendants living in remote locations because the participants need not be present in a single conference or meeting. The system is for use in connecting a plurality of auditoriums by a wired, a radio, and or a satellite communication network.

In a voice conference system, a loudspeaker is used as the receiver A plurality of microphones are used as the transmitter. Output signals of the microphones are mixed and then transmitted as a send-out signal. The loudspeaker is unavoidably acoustically coupled to the microphones. It is inevitable that a part of the audible sound reproduced by the loudspeaker is picked up by the microphones, resulting in a reverberation signal in the send-in signal. The reverberation signal is transferred to the send-out signal and sent back to the remote party. In an unfavorable case, the reverberation signal gives rise to howling. At any rate, the reverberation signal appears from the receive-in signal as an echo signal of a sort in the send-out signal.

For use in a voice conference system, an echo canceller should therefore exempt the send-out signal from the echo signal which comprises the reverberation signal. However, the echo cancelling capability of the echo canceller is limited. Especially, when the distance between the loudspeaker and microphones is reduced for enhancing miniature configuration of the system, it often occurs that the mixing output level of the echo signal exceeds the echo cancelling ability of the echo canceller in the event of reception and thereby renders incoming voice hard to distinguish while inviting howling.

SUMMARY OF THE INVENTION

It is therefore an object of the present invention to provide a voice conference system capable of lowering the mixing output level of the echo in a room during the course of reception.

In accordance with the present invention, a voice conference system has a plurality of microphones which are divided into a first and a second group. Send-out signals from the first and second groups of microphones are fed to a differential amplifier, so that the differential amplifier produces a difference signal. A receive-in signal coming in over a communication line is reproduced by a loudspeaker. A part of the reproduced signal from the loudspeaker is picked up by the microphones to become a reverberation signal. An echo canceller cancels the reverberation signal picked up by the microphones by generating an estimated reverberation signal in association with the receive-in signal. Since the differential amplifier produces a difference between the microphone signals, the reverberation signal input to the echo canceller is reduced.

BRIEF DESCRIPTION OF THE DRAWINGS

The above and other objects, features and advantages of the present invention will become more apparent from the following detailed description when taken with the accompanying drawings in which.

DETAILED DESCRIPTION OF THE PREFERRED EMBODIMENT

Figure 1:
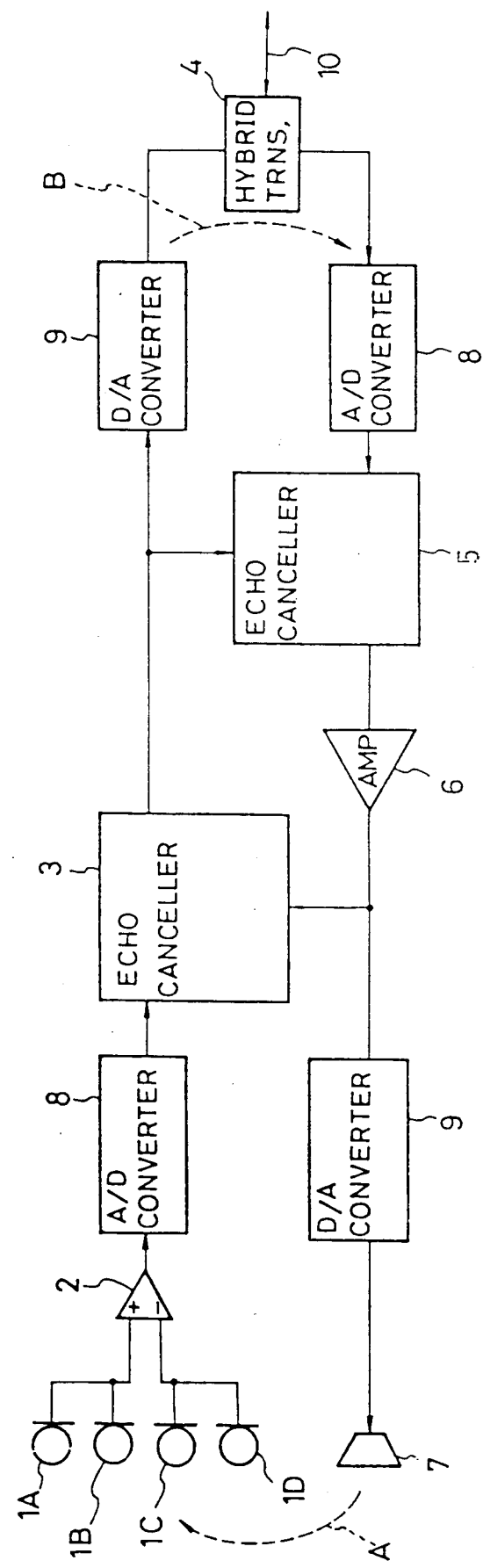
FIG. 1 is a schematic block diagram of a voice conference system embodying the present invention.

Referring to FIG. 1 of the drawings, a voice conference system embodying the present invention is shown and includes four microphones 1A, 1B, 1C and 1D, and a loudspeaker 7 which is acoustically coupled to the microphones to receive a reverberation signal indicated by a dashed arrow A. The microphones 1A and 1B are connected to a plus input terminal (+) of a differential amplifier 2, while the microphones 1C and 1D are connected to a minus input terminal (−) of the differential amplifier 2. The differential amplifier 2 functions as a mixing amplifier and produces a mixing signal indicating a difference between the sums of signals being applied to its plus and minus input terminals. The mixing amplifier 2 is connected to an analog-to-digital (A/D) converter 8, so that the mixing signal is converted to a digitized mixing signal by the A/D converter 8.

The A/D converter 8 is connected to an echo canceller 3 which cancels the reverberation signal. More specifically, the echo canceller 3 generates an estimated reverberation signal in association with a receive-in signal to the loudspeaker 7 and subtracts the estimated reverberation signal from the digitized mixing signal including the reverberation signal. The result of subtraction, or send-out signal, is routed through a digital-to-analog (D/A) converter 9 and a hybrid transformer 4 to a two-wire communication line 10. An echo canceller 5 cancels an echo signal ascribable to a send-out signal which is transferred via the hybrid transformer 4, as indicated by a dashed arrow B. An audio signal coming in over the communication line 10 from a remote party in the event of reception is amplified by an amplifier 6 and then reproduced by the loudspeaker 7.

During the course of reception, the sound being reproduced by the loudspeaker 7 is transferred to the microphones 1A to 1D, resulting in the reverberation signal, as previously stated. Nevertheless, since the mixing amplifier 2 produces the difference between reverberation signals from the microphones 1A - 1D, the mixing output level of the reverberation signal is far lower than in the case wherein reverberation signals of all the microphones 1A to 1D are simply mixed (i.e. in the same phase).

Figure 2:
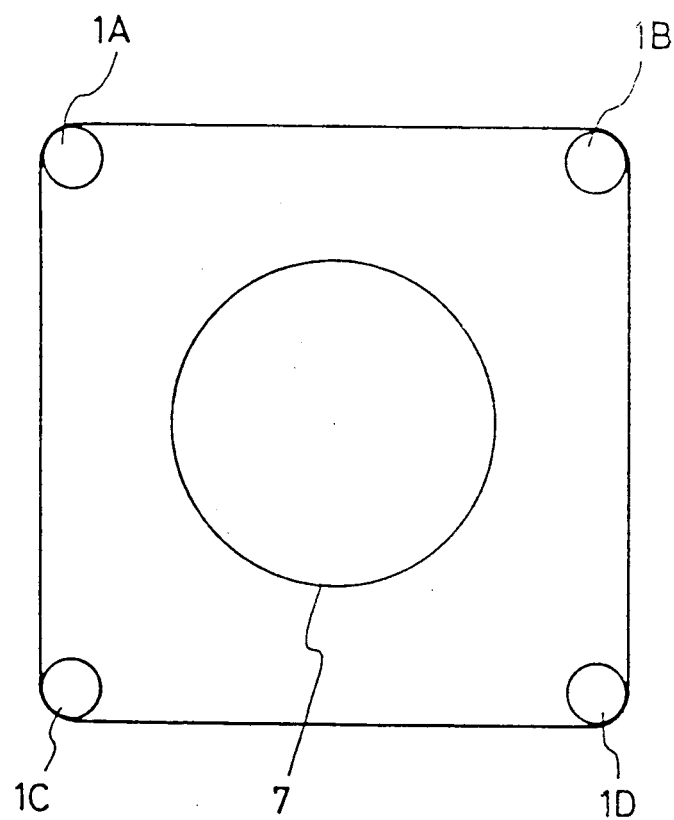
FIG. 2 is a diagram showing a specific arrangement of microphones and a loudspeaker.

FIG. 2 shows a specific arrangement of the microphones 1A to 1D and the loudspeaker 7. In the figure, the microphones 1A to 1D are located at the same distance from the speaker 7. The nearby microphones 1A and 1B are connected to the plus input terminal (+) of the amplifier 2, while the nearby microphones 1C and 1D are connected to the minus input terminal (−) of the amplifier 2. Alternatively, the microphones 1A and 1C lying on one diagonal and the microphones 1B and 1D lying on the other diagonal may be connected to the terminals (+) and (−), respectively. When the microphones 1A to 1D are located at different distances from the loudspeaker 7, the microphones 1A to 1D may be grouped in a manner which minimizes the mixing output level of a reverberation signal.

In summary, it will be seen that the present invention provides a voice conference system which achieves a far lower mixing output level of a reverberation signal than prior art in the event of reception.

What is claimed is:

1. A voice conference system comprising:
   send-out signal generating means comprising at least one first microphone for producing a first send-out signal, at least one second microphone for producing a second send-out signal, and mixing means for producing a signal representative of a difference between said first and second send-out signals from said first and second microphones, respectively;
   receive-in signal reproducing means for causing a loudspeaker to reproduce a receive-in signal coming in over a communication line to thereby output a reproduced signal; and
   echo canceler means for cancelling a reverberation signal ascribable to said first and second microphones which pick up said reproduced signal by subtracting from said reverberation signal an estimated reverberation signal which is produced based on said receive-in signal.

2. A voice conference system comprising:
   (a) a first microphone;
   (b) a second microphone;
   (c) a comparator having a first input connected to said first microphone, a second input connected to said second microphone, said comparator transmitting an electrical send-out signal with reduced reverberations;
   (c) a hybrid transformer receiving said electrical send-out signal and transmitting an electrical receive-in signal;
   (d) a speaker which receives said electrical receive-in signal and transmits an audio sound which can be received by said first microphone and said second microphone; and
   (e) an echo canceller receiving said electrical receive-in signal and said electrical send-out signal and transmitting said electrical send-out signal with further reduced reverberations.

3. A voice conference system as recited in claim 2 further comprising:
   (f) a third microphone connected to said first input of said comparator; and
   (g) a fourth microphone connected to said second input of said comparator.

* * * * *